June 2, 1953          A. I. BEAN          2,640,272
CONTOUR MEASURING APPARATUS
Filed July 20, 1946          5 Sheets-Sheet 1
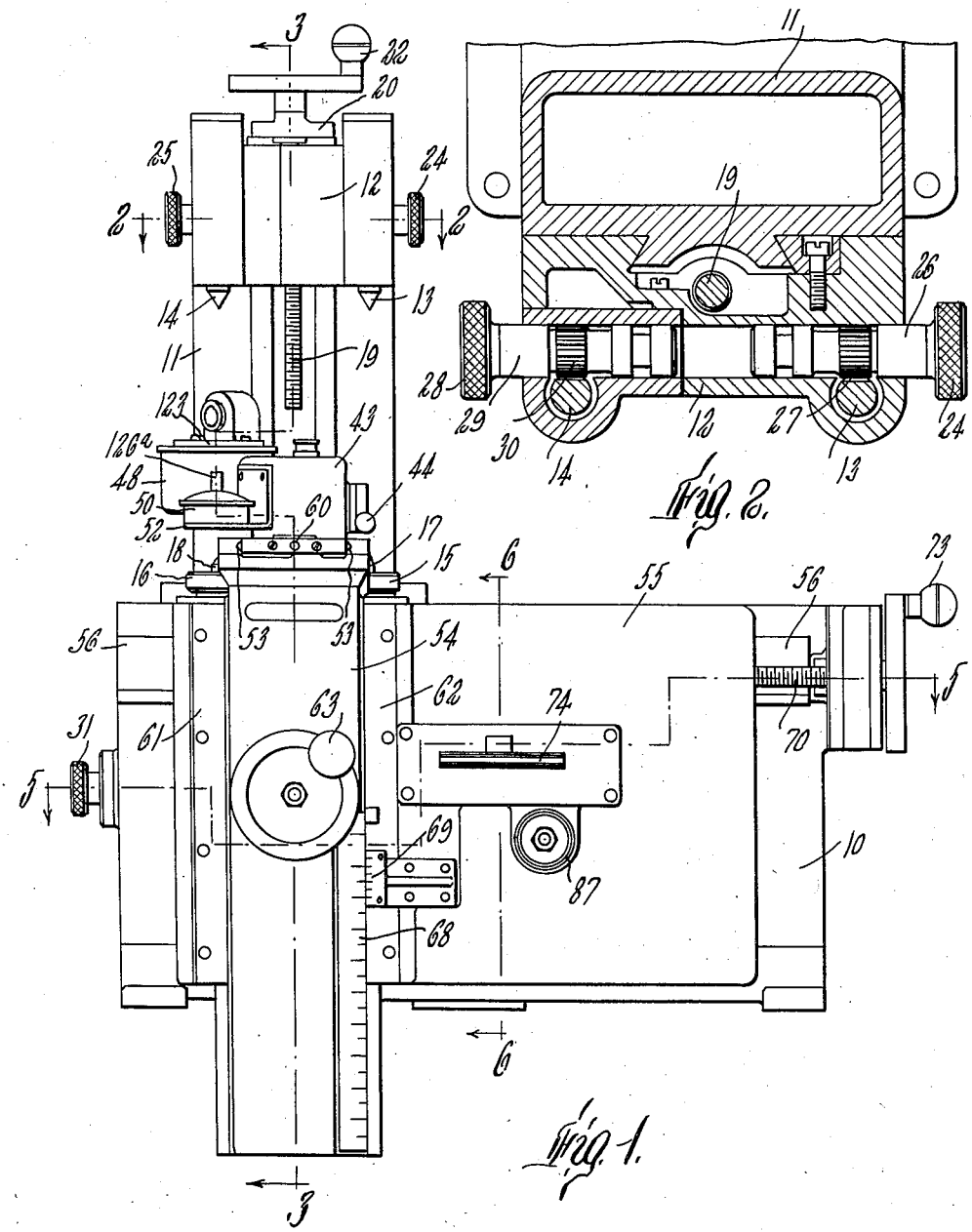
Inventor
Arthur I. Bean

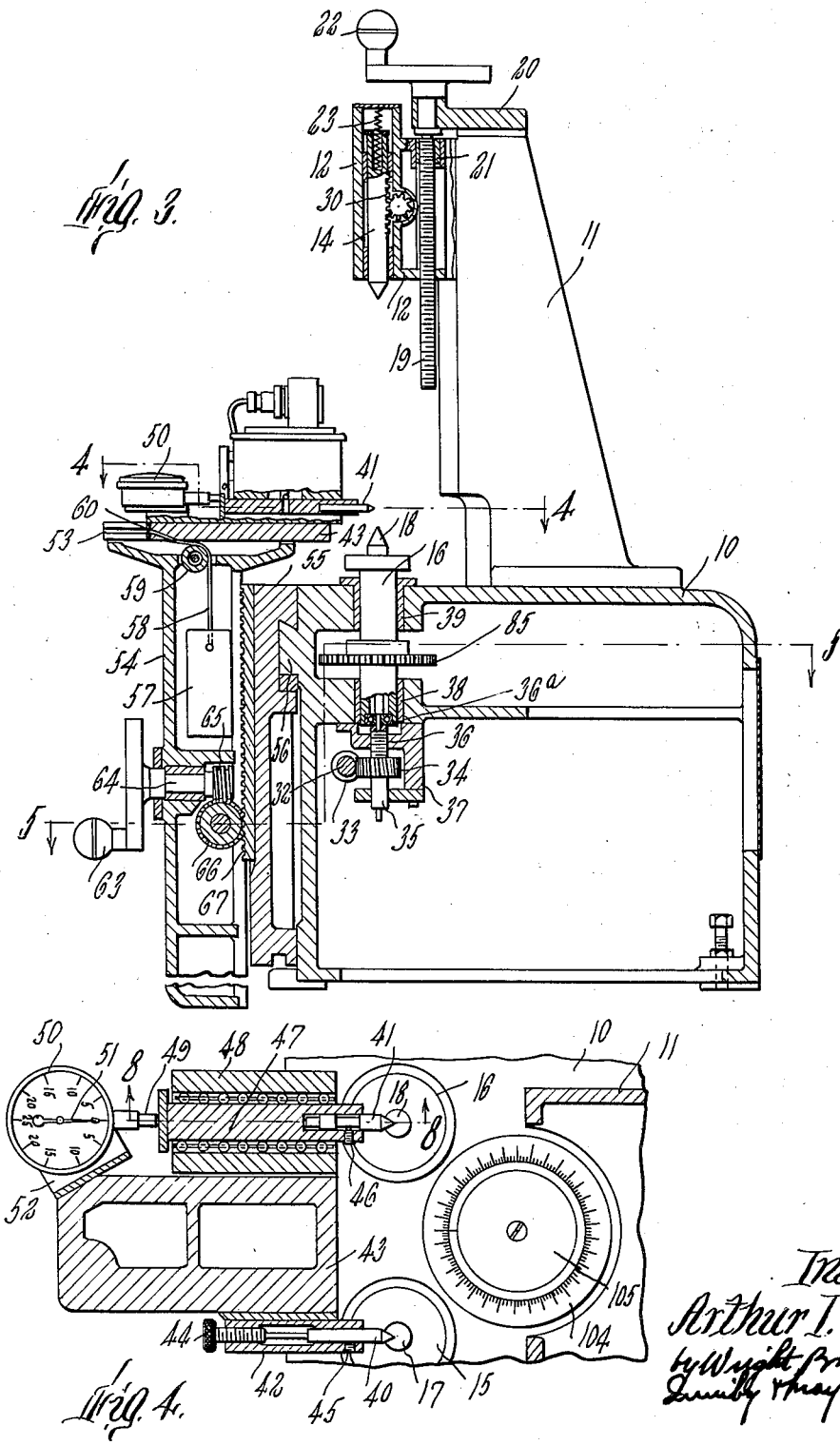

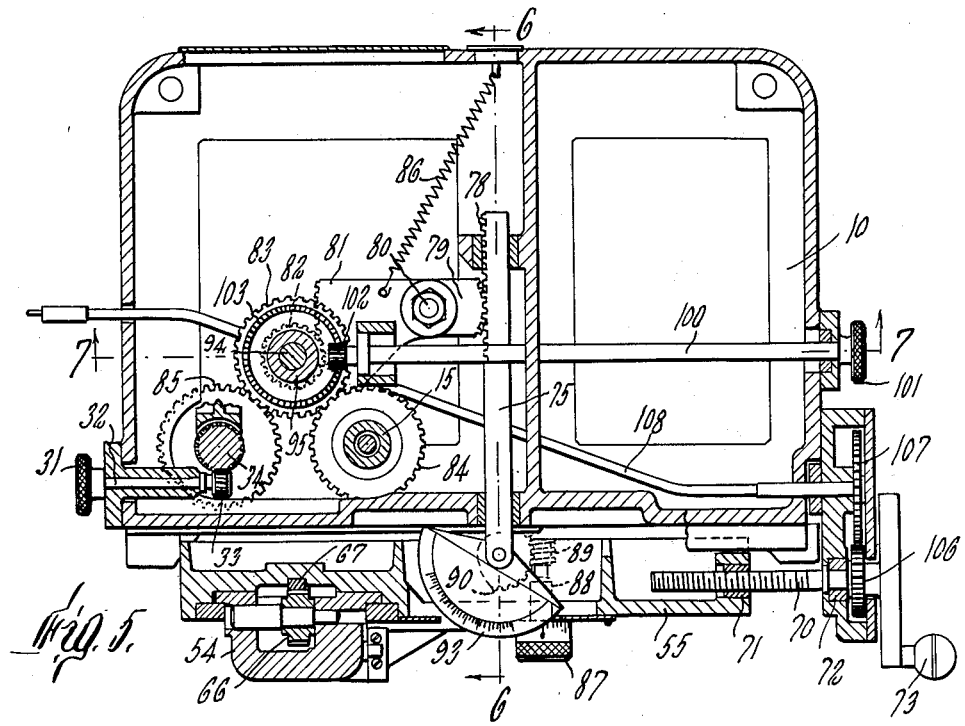

Inventor
Arthur I. Bean

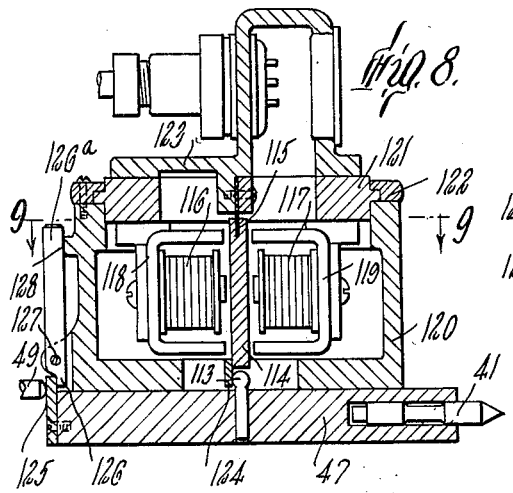

Patented June 2, 1953

2,640,272

UNITED STATES PATENT OFFICE 2,640,272

CONTOUR MEASURING APPARATUS

Arthur I. Bean, Springfield, Vt., assignor to The Fellows Gear Shaper Company, Springfield, Vt., a corporation of Vermont Application July 20, 1946, Serial No. 685,025

7 Claims. (Cl. 33—174)

The subject of the present invention is a machine or instrument for testing the accuracy of surfaces and measuring inaccuracies thereof, with reference to a master form. Forms of the character for the testing and measurement of which it is particularly designed are those such as turbine blades, propeller blades for marine vessels and aircraft, and other articles which may have considerable convexity or concavity, or may be helicoidal with or without superimposed convexity or concavity.

Objects of the invention are to afford means by which contact members may be moved simultaneously along corresponding parts of the surfaces of a master form and the manufactured article or work piece to be tested, in contact therewith, or the master form and work piece be moved past the contact members, and by which variations between the work piece and master can be indicated and accurately measured; to maintain a nearly normal relationship between the contact members and the master form and work piece when the surfaces thereof are concave or convex in large or small measure; to enable the contact members to be brought in similar relationship with different parts of surfaces of twisted or helicoidal form; and to accomplish other results related to the foregoing.

The invention comprises a supporting structure having means for holding in parallel relationship a master form and a manufactured article or work piece like or similar to the master; contact elements adapted to bear simultaneously on the master form and work piece mounted for movement of both simultaneously and for independent movement of one relative to the other in directions toward and away from the master and work piece; indicating means arranged to show, and measure the amount of, such relative movements; and suitable mechanical provisions for effecting movement of the contact elements along or across the master and work piece, or vice versa, and for effecting such relative angular movements at the same time between the contact elements and the surfaces on which they bear as may be needed to maintain such surfaces normal or nearly so, to the contact members and to the paths in which said members are movable toward and away from the master and work piece. The invention includes further, as an optional feature, a means for recording aberrations in the surface of the work piece.

An illustrated embodiment of the invention is described in the following specification with reference to the drawings, in which:

Figure 1 is a front elevation of the embodiment referred to;

Figure 2 is a horizontal detail section taken on the line 2—2 of Figure 1;

Figure 3 is a vertical section taken approximately on the line 3—3 of Figure 1;

Figure 4 is a horizontal section and part plan view taken on the line 4—4 of Figure 3;

Figure 5 is a horizontal section taken on the line 5—5 of Figures 1 and 3;

Figure 7:
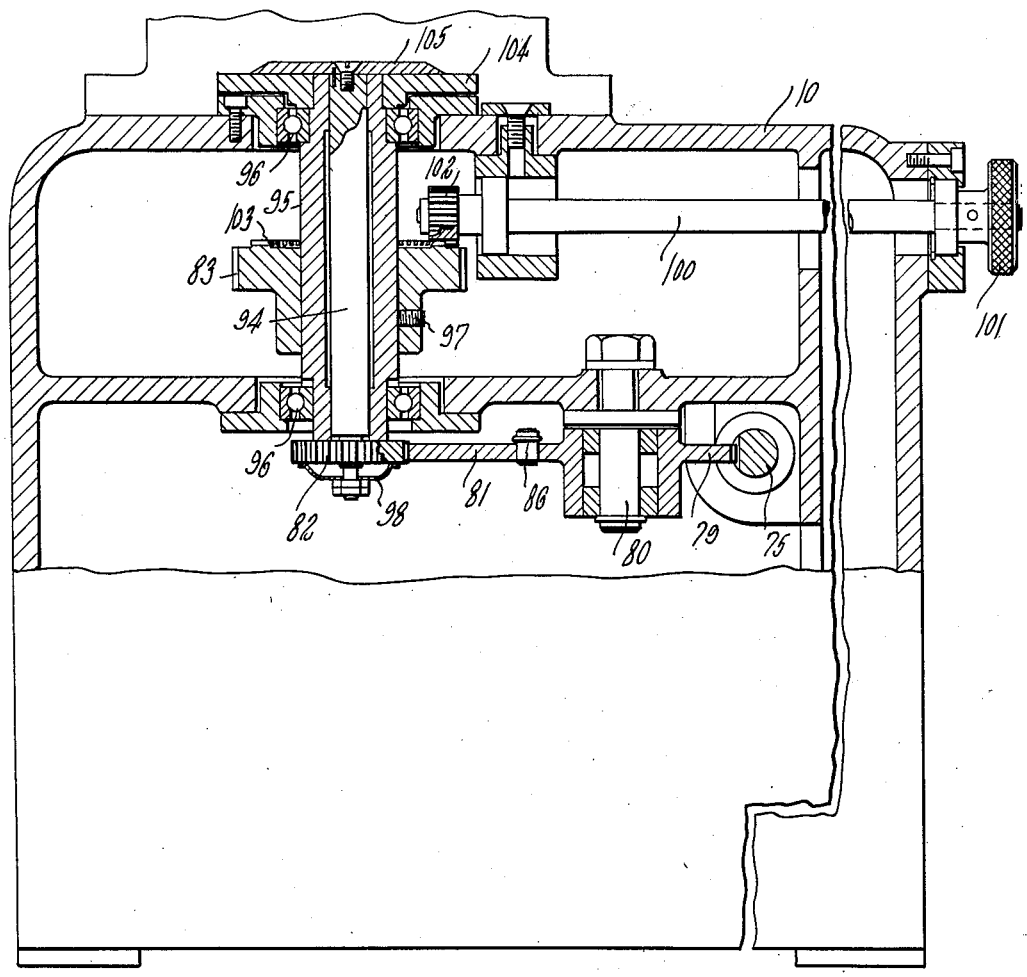

Figures 6 and 7 are vertical sections taken on lines 6—6 and 7—7 respectively of Figure 5;

Figure 8 is a detail vertical section of part of the means by which aberrations are detected and measured, taken on the line 8—8 of Figure 4;

Figure 9 is a horizontal sectional view taken on the line 9—9 of Figure 8;

Figure 10 is a view similar to Figure 8 showing a modified form of the equipment shown therein;

Figure 11 is a schematic lay-out or diagram of the operating mechanism of the instrument including a recording adjunct.

Like reference characters designate the same parts wherever they occur in all the figures.

The structural parts of the instrument or machine here shown comprise a base 10 from which a column 11 rises supporting a tailstock 12 with provision for movement lengthwise thereof (vertically in this embodiment). The tailstock carries two centers 13 and 14, mounted in parallel and in axial alignment with spindles 15 and 16, respectively, mounted to rotate in the base. These spindles carry centers 17 and 18.

The master form or gauge (shown at M in Fig. 11) is held by a fixture of any suitable type which, for use, is mounted between and held by the centers 13 and 17 and may be coupled to the spindle 15 by a dog, or other means of known character commonly used for such purposes, so that it will be rotated when the spindle is rotated. The work piece to be tested and measured (shown at W in Fig. 11) is likewise held in a suitable fixture which is mounted by and between the centers 18 and 14 and may be coupled with the spindle 16 to be rotated thereby.

The tailstock 12 can be moved along the column 11, toward and away from the spindles 15 and 16, by a screw 19 mounted rotatably in a bearing bracket 20 supported on top of the column and meshing with a nut 21 in the tailstock. A crank 22 is secured to the screw for rotating it. The centers 13 and 14 are movable endwise in the tailstock and are pressed downwardly, or toward the spindles, by springs 23, one of which is shown in Figure 3. The center 13 is retractable by a knob 24 on a shaft 26, mounted rotatably in the tailstock, having a pinion 27 meshing with rack teeth on the center; and the center 14 is retractable by a similar knob 28, shaft 29, and pinion 30.

Spindle 16, by which the work or test piece is supported, is independently adjustable endwise toward and away from the center 14 by a knob 31 secured to the end of a shaft 32 which protrudes from the left hand side of the base. Shaft 32 carries on its inner end a worm 33 meshing with a gear 34. This gear is rotatably mounted beneath the spindle 16 in axial alignment therewith and has trunnion extensions 35 and 36 supported by a bearing bracket 37. The trunnion 36 is screw threaded and meshes with threads in its bearing. Its upper end engages a thrust bearing 36a in the lower end of the spindle, thereby supporting the spindle and raising it, or permitting it to descend, according as the gear 34 is rotated in one direction or the other. The bearings 28 and 39 in which the spindle is held are so constructed as to permit free endwise movement of the spindle while embracing it closely enough to prevent side motion.

Contact members or elements 40 and 41 (which will generally be referred to as contactors hereafter in this specification) are arranged to bear against lateral surfaces of the master form and test piece, respectively. They are pins or rods having a tapered formation at their contact extremities. They are mounted with provisions for movement in three dimensions, that is toward and away from the master and work piece (i. e. to right and left with respect to the showing in Figures 3 and 4), transversely of the master and work piece (to right and left with respect to Figure 1), and lengthwise of the master and work piece (in parallel with the axes of the spindles and tailstock centers). In addition the contactor 41 is movable independently of the contactor 40 in the first of the above mentioned dimensions; and the contactor 40 is adjustable in the same dimension. Contactor 40 is mounted in a housing 42 which is attached to a carriage 43. It is adjustable endwise into positions established by a stop screw 44, mounted in the housing 42 in alignment with the contactor, and is fixed in its adjustments by set screw 45. Contactor 41 is secured removably (by a set screw 46) in a sub-carriage or holder 47 contained in a guide 48 which is secured in any suitable way to carriage 43 and forms a part thereof. This sub-carriage 47 is movable endwise in guide 48 in a direction parallel to the length dimensions of the contactors and to the path of adjustment of contactor 40. In this illustration this direction is perpendicular to the common plane of the axes of the two spindles 15 and 16. The sub-carriage or holder 47 is arranged to transmit thrust to, and receive transmission of thrust from, the plunger 49 of a multiplying indicator 50 of well-known character, having a pointer or hand 51 which is movable over a circular dial in consequence of movement of plunger 49, and containing a spring by which the plunger is impelled outward. This indicator shows and measures, on an enlarged scale, any movements of the holder 47 and contactor 41 relative to the carriage 43. It is held by a bracket 52 secured to the carriage 43.

For convenient verbal distinction between the contactors the one (40) which bears on the master form may be called the master contactor and the other (41) the detecting 30 contactor.

Carriage 43 is mounted in guideways 53 provided on the upper end of a slide 54 and extending perpendicular to the common plane of the spindle axes. Slide 54 is mounted, and vertically movable, on a saddle 55 which is supported by a guide 56 on the forward side of the base 10 so as to be movable thereon in a horizontal path perpendicular to the path in which the carriage 43 is movable.

The contactors 40 and 41 are preferably so mounted on carriage 43 that their center lines and pointed extremities coincide with their paths of movement and intersect the axes of the spindles 15 and 16, respectively, at right angles. They are constantly forced toward these axes, when withdrawn therefrom, by a weight 57 which is suspended by a cord or chain 58 passing around a guide pulley 59 on the slide 54 and is made fast to carriage 43 at a point 60 forward from the guide pulley. Thus the weight serves to hold the contactors constantly against any master form and work piece which may be mounted between the centers, as before described, and permits the contactors to be moved outward by reaction with protuberant contours of the master and work piece when the contactors are transported across or along the master and work piece.

Slide 54 is held on saddle 55 by guides 61 and 62 arranged to confine movements of the slide to a path parallel with the spindle axes. It can be moved in this path by means of a hand wheel 63 on the protruding end of a shaft 64 which carries a worm 65 meshing with a gear 66. Both shaft 64 and gear 66 are supported by the slide 54 and the gear meshes with the teeth of a rack 67 on the saddle 55.

The displacement of the contactors by the last described mechanism is usually imparted to locate the contactors for traverse across different parts of the length of the master form and work piece. The distances of such positions from one end or the other of the master form, and from each other, are measured by a scale 68 carried by the slide and a vernier 69 mounted on the saddle. But this mechanism can be used also for causing a progressive traverse of the contactors over the master and work piece lengthwise thereof while the saddle remains stationary.

Movement is imparted to the saddle lengthwise of its guide 56 by a lead screw 70 which meshes with a nut 71 in the saddle and is supported by a bearing 72 attached to the base. A hand wheel 73 is secured to the screw for rotating it.

The saddle 55 and slide 54 constitute a two-part support for carriage 43 movable transversely of the spindle axes, and of which one part (the slide) is movable lengthwise also of these axes.

The disposition of the contactors with respect to the master form and work piece is shown in Figure 11. Here the master form is designated M and the work piece W. It is evident that, when the saddle 55 is moved in the direction of the arrow A, the carriage 43 is moved in the direction of arrow B by reaction of the contactor 40 with parts of the master form which protrude forwardly beyond adjacent parts or points, and in the opposite direction by weight 57 when receding contours of the master form permit. The detecting contactor 41 travels across the surface of the work piece and, if the surface of the latter conforms exactly with the surface of the master form, it moves with the carriage in exactly the same measure. But if the work piece surface departs in any respect, on the line of traverse, from the master form, such departure causes movement of the detecting contactor relative to the carriage 43 and such relative movement is shown with enlargement by indicator 50.

The master form and work piece represented in Figure 11 are deeply concave on one side and highly convex on the opposite side. With such pieces it is desirable to rotate them about the axes of the spindles 15 and 16, while the contactors travel laterally across them, at such a rate as will maintain the surfaces on which the contactors bear substantially or nearly normal to the paths of back and forth movement of the contactors. Otherwise, the contactors would be obstructed more or less by inclined parts of the surfaces, and might be blocked and injured by inclines of excessive steepness.

Therefore, I have provided a means for turning the spindles while the contactors travel across the master form and test piece. Such means, in the present embodiment, comprises a cam member 74, which I call a tangent bar, mounted on the saddle, and gearing coupled with the spindles and actuated by the tangent bar as the saddle travels. A rack bar 75 is mounted in the base to to be movable forward and back, and carries at one end a roller 76 bearing on the reaction surface 77 of the tangent bar. Rack bar 75 has teeth 78 meshing with a gear segment 79 rotatable about a pivot stud 80. A second gear segment 81, rigidly connected with segment 79 meshes with a gear 82 which is coupled, in a manner later described, with a coaxial gear 83. The latter gear meshes with gears 84 and 85 on the spindles 15 and 16, respectively. This mechanism is shown in Figure 5 as well as in Figure 11. A spring 86 engaged with segment 81 and anchored on the base exerts force in the direction to hold the roller on the outer end of rack bar 75, in contact with the tangent bar.

It will be apparent that if the tangent bar is set so that its reaction surface 77 is inclined in any degree to the path of the saddle 55, the spindles will be rotated when the saddle travels, and the degree and rate of their rotation will be determined by the inclination at which the reaction surface of the bar is set.

The tangent bar can be tilted in either direction so that its reaction surface is of either advancing or receding character with respect to the rack bar when the saddle travels in the direction of arrow A. With the direction of inclination shown in Figures 5 and 11, the tangent bar is set to give the proper character of rotation to concave surfaces. If placed at the opposite inclination, it would serve for convex surfaces. Adjustment of the tangent bar is effected by a knob 87 (Fig. 5) on a shaft 88, journaled on the saddle, which carries a worm 89 meshing with a gear segment 90 on the shaft 91 which carries the tangent bar. An index 92 (Fig. 6) on the saddle is located adjacent to a scale of angular degrees 93 on the circular outer margin of the tangent bar to measure the angles at which the bar is set.

Although the reaction surface of the tangent bar is here shown as being straight, which is the condition suited for controlling work pieces of circular curvature, cam elements equivalent to this tangent bar, but having reaction surfaces of other outlines may be provided for controlling master forms and work pieces of other profiles. The reaction surface may be curved with a uniform or variable curvature, either concave or convex, or made with a sinuous curve or any other desired suitable succession of curves or straight lines. It is not essential that the curves of the master and work pieces be exactly normal to the contactors, for efficient operation is possible when they are appreciably out of normal. Hence, considerable latitude in designing the outline of the reaction surface of the tangent bar is permissible. The important fact is that the machine is provided with suitable means for turning the pieces in a manner to avoid excessive steepness of the surfaces over which the contactors must slide.

Many articles have twisted surfaces and some of these combine concavity or convexity with a twist. A feature of this machine resides in provisions whereby the spindles can be adjusted angularly relative to their rotating means so that different parts of the length of such twisted surfaces can be located normal to the contactors, or approximately so. For this purpose, the gears 82 and 83 are connected by means permitting angular displacement of one relative to the other. An embodiment of such means is shown in Fig. 7. Gear 82 is here keyed to a shaft 94 which is fitted rotatably in a coaxial tubular shaft 95 supported in bearings 96 in the base. Gear 83 is made fast, releasably, to the tubular shaft by a set screw 97 and gear 82 is pressed firmly against one end of the tubular shaft by a spring washer 98 which reacts against an abutment nut 981 on shaft 94. The friction clutch thus constituted is powerful enough to transmit rotation to the gear 83 (and therefrom to the spindles) when segment 81 is rotated, but it also permits the tubular shaft to be independently rotated.

For so rotating the tubular shaft, a rod or shaft 100 is mounted in the base carrying a knob 101 on its outer end, by which it can be manually rotated, and a pinion 102 on its inner end meshing with teeth 103 of face gear character on the adjacent surface of gear 83. A dial 104 is secured to the tubular shaft 95 on top of the base, carrying a scale of angular degrees (Fig. 4) with which cooperates an index mark on a disk 105 secured to the inner shaft 94, for measuring angular settings of the spindles in accordance with the twist of the master form and work piece.

Variations of the work piece from conformity with the master form are shown temporarily by the indicator 50. The machine also includes means for making a permanent record of such aberrations.

Referring again to Fig. 11, the lead screw 70 carries a gear 106 meshing with a gear 107 to which one end of a flexible shaft 108 is coupled. The opposite end of the flexible shaft carries a pinion 109 which, through a train of gears 110 (including a reversing gear) drives a drum 111 over which a strip of paper 112 passes and by which the paper is propelled. A pen or other suitable marker is arranged adjacent to the paper strip to drawn a line thereon when the strip is propelled past it, and the pen is moved transversely of the travel of the paper by an electrical bridge system controlled by movement of the detecting contactor 41.

The bridge system used here is of known character in its general principles, and may be essentially like that shown in the patent of Stewart G. Leonard 2,305,264 granted December 15, 1942. The present invention, however, contains new features embodied in means of connecting the detecting contactor with the armature of the balancing coils of the bridge circuit, and in provisions for effecting a change of magnification by the electronic system without calibration.

Referring to Figures 3 and 8, the sub-carriage or holder 47 for the detecting contactor carries a stud 113 which is engaged with a plate or armature 114 of magnetic metal suspended by a flexible spring hanger 115 between coils 116 and 117. These coils surround cores of magnetic material in holders 118 and 119, likewise of magnetic material, and are contained in a housing 120 mounted on the holder guide 48 which, as previously stated, is supported on the carriage 43. The holders 118 and 119 are suspended from a ring 121 which rests, and is rotatable, on the walls of the housing 120 and is secured thereto by a clamp ring 122. The suspender spring 115 for armature 114 is hung from a cover 123 which is mounted on the ring 121 and contains the fittings through which connection may be made with external electric circuits.

The armature is separated from the cores of both coils by air gaps and, when moved toward either coil and simultaneously away from the other, it changes the reluctance of the magnetic circuits so that voltages existing across the coils are varied. Being connected in an electrical bridge circuit with suitable amplifying and other equipment and means for moving the marker, the voltage changes resulting from shifting of the armature cause movements of the marker across the recording tape.

It has been the practice heretofore to adjust the coils toward and away from the armature in order to effect a change in magnification, but the range of adjustment by such means is narrowly limited. The mounting of the coil unit here shown permits unlimited adjustments for magnification and other purposes.

By loosening the clamp 122 and rotating ring 121, the axis of the coils can be set at an inclination to the movement of the contactor, as shown by Figure 9, and at all other angles from 0 to 90°. Engagement of stud 113 with the armature 114 is by means of a plate 124 secured to the armature which is maintained in engagement with one side of the stud by the hanger spring 115. The stud can slide along this plate when moving with the detector and when the armature is at other than right angles to the path of the stud.

When the coils are turned, as in Figure 9, so that their axis makes an angle $a$ with the path of the contactor, the movement imparted to the armature is shorter than that of the contactor, being equal to the travel of the contactor multiplied by the cosine of angle $a$. The factor represented by the cosine of the angle can be varied between 1 and 0. By virtue of this wide range of adjustment the coil can be set in a position which gives the best magnification, and the user can vary the magnification at will to meet various requirements, without recalibration. By this means also the same portion of the magnetic field is used for the full range of the indicator, meter or recorder, for any magnification. All such adjustments can be made with the utmost ease and simplicity.

The carrier 47 actuates the plunger 49 of the mechanical indicator through a plate 125 which is secured to the outer end of the carrier and against which the plunger 49 of the indicator bears. A shiftable stop 126 is pivoted at 127 to the housing 120 and has a handle portion 126a by which it can be placed in and out of the way of plate 125. When the handle is brought up against an abutment 128 on the housing 120, the armature is brought into a prescribed middle or zero position, and the indicator 50 and recording marker can be set to indicate zero when the armature is in that position.

With the detecting contactor located in such zero position, the master contactor 40 can be adjusted with the aid of its stop screw 44 to enable both contactors to be located in, or at the same distance from, the axes of the two spindles.

A modification of the assemblage of contactor holder and armature balancing coils of the electronic system is shown in Figure 10. Here the contactor holder 47a is suspended at points near its ends by two flexible reeds 115a and 115b which are clamped to the housing 120. The armature 114a is mounted on the holder by means of a stem 129 projecting from its base in extension with its median line and contained rotatably in a socket in the holder. The coils and their cores are rotatably engaged with the housing in the same manner as previously described, and both they and the armature can be set at any angle to the path in which the contactor travels, with the same effect as previously described.

Other modifications in, and departures from, the specific construction hereinbefore described may be made for making the specific comparisons before mentioned and many others in which errors in work pieces may be detected by comparison with a master, without departing from the spirit and scope of the invention and of the protection herein claimed.

Among other specific uses, additional to those previously mentioned, to which the principles of the invention can be applied are the following:

Measurement of eccentric or non-circular parts such as cams, including those which have both convex and concave and/or straight portions. By rotating the spindles on which the test piece and master are mounted, without at the same time displacing the saddle 55 laterally, the instrument will indicate the amount by which the cam being tested is large or small with relation to the diameter, indicate the relation of the cam rises and/or descents to the keyway, and indicate the slope of the cam.

The cone measurement of eccentric and non-circular gears can be checked with reference either to a master eccentric disk or a master gear. In that case the driving means for propelling the paper is correlated with the rotation of the spindles.

The relation of flats to other surfaces or sections on a shaft, and the alinement of cams on a cam shaft can also be measured by a machine embodying the generic principles of that herein described and claimed.

What I claim is:

1. An apparatus for comparing surface contours comprising a supporting structure, spindles rotatably mounted side by side on said supporting structure, one of said spindles being adapted to hold a master form and the other to hold a work piece, a saddle mounted on the supporting structure to be movable in a path transverse to the spindle axes, a carriage mounted on the saddle with provision for movement in a path transverse both to the saddle path and to the spindle axes, contactors on the carriage protruding therefrom in positions such that one contactor is adapted to bear on a surface of a master form held by one of said spindles and the other to bear on a surface of a work piece held by the other spindle, one of said contactors being normally fixed immovably on the carriage and the other being movable relatively to the carriage in substantial parallelism with the carriage path, and mechanism for causing rotation of the spindles at a prescribed rate simultaneously with travel of the saddle.

2. An apparatus for comparing surface contours comprising a supporting structure, spindles rotatably mounted side by side on said supporting structure, one of said spindles being adapted to hold a master form and the other to hold a work piece, a saddle mounted on the supporting structure to be movable in a path transverse to the spindle axes, a carriage mounted on the saddle with provision for movement in a path transverse both to the saddle path and to the spindle axes, contactors on the carriage protruding therefrom in positions such that one contactor is adapted to bear on the surface of a master form held by one of said spindles and the other to bear on the surface of a work piece held by the other spindle, one of said contactors being normally fixed immovably on the carriage and the other being movable relatively to the carriage in substantial parallelism with the carriage path, and means operated by the saddle in its movement for imparting rotation to the spindles.

3. An apparatus according to claim 2 in which the means for rotating the spindles includes a cam element having a reaction surface, carried by the saddle and being angularly adjustable thereon to place such reaction surfaces at various inclinations to the path of the saddle, a movable element on the supporting structure bearing on said reaction surface and arranged to be displaced thereby when the saddle travels, and connections arranged to impart rotation to the spindles when said element is so displaced.

4. An apparatus for comparing surface contours comprising a supporting structure, spindles mounted side by side on said supporting structure with capability of rotation, a saddle mounted on said structure and movable in a path transverse to the spindles, a carriage on said saddle movable thereon in a path transverse to the path of the saddle and to the axes of the spindles, contactors projecting from the carriage in intersecting relation with the axes of the respective spindles, yielding force supplying means acting on the carriage in the direction toward the axes of said spindles, one of said contactors being fixed to the carriage and the other being movable relative thereto, a tangent bar mounted on the saddle having a reaction surface and being angularly adjustable to place such reaction surface at various inclinations to the path of the saddle, a rack bar mounted on the supporting structure to be movable in a path transverse to that of the carriage and in abutting relation with said reaction surface, and gearing between said rack bar and spindles operable by the rack bar in its movements of displacement to cause rotation of the spindles.

5. An apparatus as set forth in claim 4 including an angularly shiftable connection in the gearing for permitting rotational adjustment of the spindles relative to the rack bar.

6. An apparatus for the purpose set forth, comprising a base, spindles mounted rotatably side by side in said base, a column mounted on the base, a tailstock mounted on said column and movable thereon toward and away from the spindles, centers carried by the tailstock in axial alignment with the respective spindles projecting toward the spindles and being adapted to cooperate therewith in holding a master form and a work piece, respectively, one of said spindles being shiftable axially independently of the other, a saddle on the base movable in a path transverse to the axes of the spindles and substantially parallel to the common plane of said axes, a slide on the saddle movable substantially parallel to said axes, a carriage on said slide movable in a path transverse to the paths of both saddle and slide, contactors on said carriage protruding therefrom and adapted to be brought, by movement of the carriage, with their extremities in, and at various distances from, the respective spindle axes, yieldable force applying means acting on the carriage tending to move it toward the spindle axes from a withdrawn position, one of said contactors being movable independently of the other in said carriage, means for measuring independent movement thereof, and means operated by the saddle when moved in its appointed path for imparting rotation to the spindles.

7. An apparatus for testing the accuracy of surfaces comprising a supporting structure, a saddle movable on said structure in a prescribed path, two spindles mounted side by side rotatably on the said structure with their axes parallel to each other in a plane parallel to the path of the saddle, said axes being transverse to said path, a carriage supported by the saddle at one side of said plane and being movable toward and away from the spindles, one of the spindles being adapted to hold a master form having a surface facing toward said carriage of which the contour is other than parallel to said path, and the other spindle being adapted to hold a similar work piece in similar manner, a fixed contact element on the carriage projecting into contact with said master form, a detector contact element on the carriage projecting into contact with the work piece and being movable relatively to the carriage toward and away from the plane of the spindle axes, and means operated by the saddle in its movement for rotating the spindles whereby to maintain the surfaces of the master form and work piece substantially normal to the contact elements at the points of contact therewith.

ARTHUR I. BEAN.

References Cited in the file of this patent

UNITED STATES PATENTS

| Number | Name | Date |
|---|---|---|
| 1,652,435 | Goodrich | Dec. 13, 1922 |
| 2,011,931 | Dreyer | Aug. 20, 1935 |
| 2,016,420 | Engst | Oct. 8, 1935 |
| 2,016,978 | Thomas | Oct. 8, 1935 |
| 2,065,951 | Terry | Dec. 29, 1936 |
| 2,083,759 | Temple | June 15, 1937 |
| 2,108,414 | Schurr | Feb. 15, 1938 |
| 2,202,638 | Praeg | May 28, 1940 |
| 2,239,811 | Cuppers | Apr. 29, 1941 |
| 2,251,339 | Miller | Aug. 5, 1941 |
| 2,305,264 | Leonard | Dec. 15, 1942 |
| 2,313,133 | Ernst | Mar. 9, 1943 |
| 2,336,845 | Christensen | Dec. 14, 1943 |
| 2,408,524 | Mestas | Oct. 1, 1946 |
| 2,445,455 | Rights | July 30, 1948 |
| 2,465,032 | Neff | Mar. 22, 1949 |

FOREIGN PATENTS

| Number | Country | Date |
|---|---|---|
| 608,163 | Germany | Jan. 18, 1935 |